Nov. 4, 1952
C. H. O. BERG
2,616,521
ADSORPTION PROCESS
Filed Feb. 21, 1949
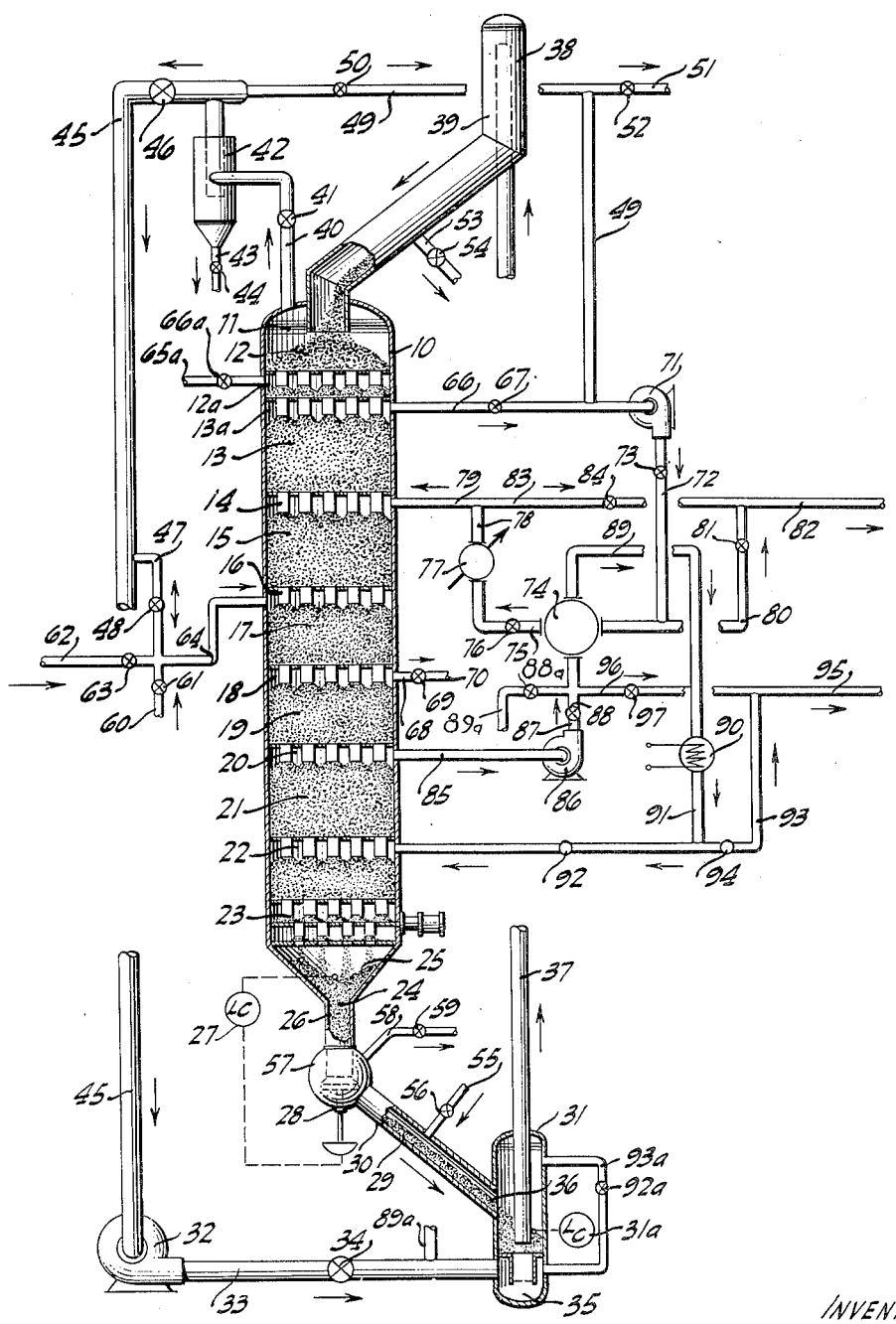
INVENTOR.
CLYDE H. O. BERG,
BY Ross J. Garofalo
ATTORNEY.

Patented Nov. 4, 1952

2,616,521

UNITED STATES PATENT OFFICE 2,616,521

ADSORPTION PROCESS

Clyde H. O. Berg, Long Beach, Calif., assignor to Union Oil Company of California, Los Angeles, Calif., a corporation of California Application February 21, 1949, Serial No. 77,556

6 Claims. (Cl. 183—114.2)

This invention relates to an improvement in the selective adsorption process and more particularly relates to a selective adsorption process in which marked reductions in utilities requirements such as fuel and cooling water requirements are obtained.

The selective adsorption process is described in the transactions of the American Institute of Chemical Engineers, volume XLII, page 665. In this process the gaseous mixture is contacted with a substantially compact downwardly flowing bed of solid granular adsorbent which flows successively through a cooling zone, an adsorption zone, a rectifying zone, a steaming zone and a stripping zone and is then returned to the top of the column for reuse. In the stripping zone, the adsorbent is heated and contacted with a countercurrent flow of steam or other stripping gas. The more readily adsorbable constituents of the gaseous mixture are hereby desorbed as a make gas or rich gas product and the hot lean adsorbent resulting is conveyed to the top of the column and passed through a cooler around the tubes of which cooling water or other cooling liquid is circulated.

It has now been found that by employing a special recirculation of part of the make gas or rich gas product as a heat transfer medium through the stripping zone and part of the lean gas product as a heat transfer medium through the cooling zone, a marked reduction in the fuel and cooling requirements may be made.

The primary object of this invention is to provide an improved selective adsorption process having reduced utilities requirements.

Another object of this invention is to provide a selective adsorption process in which the moving bed of adsorbent is cooled by a recirculating stream of lean gas product and is heated with a recirculating stream of rich gas product.

Another object of this invention is to improve the economy of selective adsorption process in which the recirculating lean gas stream is exchanged with the recirculating rich gas stream to transfer heat from the cooling zone to the heating zone.

A further object of this invention is to provide an improved process whereby the constituents adsorbed on the adsorbent are removed in the absence of a stripping gas.

An additional object of this invention is to provide an apparatus adapted to accomplish the aforementioned objects.

Other objects and advantages of the invention will become apparent to those skilled in the art as the description thereof proceeds.

Briefly, the present invention comprises an improved selective adsorption process in which a portion of the rich gas product, that is, that fraction of gases separated by desorption from the moving bed of granular adsorbent, is recirculated through the heating zone. The adsorbent is thereby heated by introducing heat into the recirculating rich gas stream outside of the heating zone for transfer to the adsorbent therein. The adsorbent in the cooling zone is cooled by a recirculating stream of lean gas product and the heat gained from the adsorbent in the cooling zone is removed from the recirculating lean gas stream at a point outside the cooling zone by interchange and introduced into the recirculating rich gas stream thus effecting an important heat economy.

The cooling zone and the heating zone of the selective adsorption column may be constructed so that the recirculating gases directly contact the adsorbent or may be constructed as a tube bundle with the adsorbent passing through the tubes so that the recirculating gases are in indirect heat exchange relation to the adsorbent. Further, one zone may be constructed as a tube bundle for indirect heat transfer while the other may utilize direct heat exchange if desired. Preferably no tubes are employed and the recirculating streams contact the adsorbent directly.

The rate of recirculation of the rich gas stream through the heating or desorption zone is dependent upon the specific heat of the adsorbent, the specific heat of the recirculating rich gas under the particular conditions of pressure and temperature, and the circulation rate of the adsorbent through the system. To obtain the highest degree of efficiency with regard to heat transfer from the adsorbent in the cooling zone to the adsorbent in the heating zone so that the adsorbent in the heating zone will be heated to substantially the same temperature at which the adsorbent entered the cooling zone with a minimum of external heating and cooling requirements, a quantity of heat transfer gas (the recirculated rich gas) is controlled in close proportion to the product of the adsorbent circulation rate and the ratio of the specific heats of the adsorbent and the recirculating gas. In other words, it is desirable that the recirculating gas stream be adjusted to have a flow rate so that it leaves the heating zone substantially at the temperature of the entering adsorbent and raises the temperature of the adsorbent in the heating zone to substantially the temperature at which the rich gas recycle enters. Under these conditions, the recirculation rate of rich gas in pounds per hour is equal to the following:

$$W_{rg}=W_a\left[\frac{C_{pa}}{C_{prg}}\right]$$

where $W_{rg}$ is the rate in pounds per hour of rich gas recirculation, $W_a$ is the rate of circulation of adsorbent in pounds per hour and $C_{prg}$ and $C_{pa}$ are the specific heat in B. t. u.'s per pound per degree Fahrenheit of the recirculating rich gas and the adsorbent, respectively. Under these conditions the adsorbent in the heating zone is heated from temperature $T_1$ to desorption temperature $T_2$, and the adsorbent in the cooling zone is cooled from temperature $T_2$ to adsorption temperature $T_1$ by a circulation of $W_{rg}$ pounds per hour of rich gas product.

A similar relation applies to the recirculation of the lean gas stream through the cooling zone where the desired recirculation rate in pounds per hour is equal to $$W_{lg}=W_a\left[\frac{C_{pa}}{C_{plg}}\right]$$

where $W_{lg}$ is the rate in pounds per hour of lean gas recirculation, $C_{plg}$ is the specific heat in B. t. u.'s per pound per degree Fahrenheit of the recirculating lean gas and the other characters are for units as defined above.

This process is particularly well adapted to those separations in which extremely high purity of both products is not required. The rich gas product obtained is essentially uncontaminated by the less readily adsorbable constituents; however, the lean gas product may contain small percentages of the more readily adsorbable constituents normally present in the rich gas product. It is possible, however, to operate this process as hereinafter described, using recycle streams from various parts of the operation to the feed gas whereby high purity products may be obtained.

Although this process is not limited to any type of gaseous mixture, it is particularly well applied to the specific separations involving $C_2$, $C_3$, $C_4$ and heavier hydrocarbon gases from the lower molecular weight hydrocarbons and/or other gases which are not readily adsorbed. It is of further advantage to operate at a pressure such that the specific heat of the recirculating stream will be somewhat increased over its value at atmospheric conditions. Operation pressures, however, may range from as low as atmospheric pressures to as high as 500 or 600 pounds per square inch or higher and the actual operating pressure is generally determined on the basis of the pressure at which the feed gas is available since separations may be made at virtually any pressure so long as the constituents of the feed gas remain in the vapor phase.

The present invention may be more readily understood by reference to the accompanying drawing in which a combination schematic flow diagram and vertical cross section of the selective adsorption column is shown in which the improved process of this invention may be effected.

Referring now to the drawing, selective adsorption column 10 is provided at successively lower levels therein with elutriation space 11, hopper 12, purge gas disengaging zone 12a, cooling zone 13, lean gas recycle disengaging zone 13a, lean gas recycle engaging zone 14, adsorption zone 15, feed gas engaging zone 16, first rectification zone 17, side cut gas disengaging zone 18, second rectification zone 19, rich gas recycle outlet 20, heating zone 21, rich gas recycle inlet zone 22, feeding zone 23 and bottom zone 24 in which an adsorbent level 25 is maintained. Sealing leg 26 is maintained full of a substantially compact bed of adsorbent by means of level control 27 actuated by adsorbent flow control valve 28. Feeder zone 23 controls the circulation rate of carbon through the column to any desired value and level control 27 and adsorbent valve 28 act to maintain both adsorbent level 25 as well as a uniform flow 29 of adsorbent through transfer line 30 into induction chamber 31. Lift gas blower 32 introduces lift gas, having the approximate composition of the lean gas product, under pressure via line 33 controlled by valve 34 into lift gas inlet zone 35 of induction chamber 31. Adsorbent level 36 is maintained in chamber 31 and a lift gas-adsorbent suspension is formed which is conveyed via lift line 37 upwardly into impactless separator 38. Herein the suspension is broken and the lift gas and adsorbent are conveyed as substantially independent phases into elutriation zone 11. Herein the lift gas suspends adsorbent fines and carries them out of elutriation zone 11 via line 40 controlled by valve 41 into separator 42. The fines are removed therefrom via line 43 controlled by valve 44 and the fines-free lift gas is conveyed via line 45 controlled by valve 46 to the suction inlet of lift gas blower 32. A portion of the recirculating lift gas may be combined with the feed gas via line 47 controlled by valve 48 when the lift gas pressure is maintained higher than the feed gas pressure, and if desired, a portion may be passed via line 49 controlled by valve 50 to be combined with the lean gas product or it may be produced as a separate product via line 51 controlled by valve 52.

A portion of the adsorbent circulation, passing through transfer line 39, is removed therefrom via line 53 at a rate controlled by valve 54 and is introduced into a separate high temperature steam reactivator not shown. This reactivator is employed to maintain the adsorptive capacity of the recirculating adsorbent at any desired value by effecting a high temperature desorption of less readily desorbable constituents than those removed in the rich gas product. Such constituents may appear on the adsorbent through entrainment in the feed gas or by polymerization of certain constituents which may be present with the feed gas. The reactivated adsorbent is returned to the system via line 55 controlled by valve 56.

A vent gas is removed from adsorbent flow control valve chamber 57 by means of line 58 controlled by valve 59 and comprises a mixture of lift gas and rich gas. If desired, this vent gas may be combined with feed gas by means of line 60 controlled by valve 61, or it may be discarded or combined with one of the product gases if the purity of the product is not required to be unusually high.

The gaseous mixture to be separated passes via line 62 controlled by valve 63 and is combined with other gases such as those recirculated through lines 47 or 60 and is introduced via line 64 into feed gas engaging zone 16. The gas passes upwardly countercurrent to the lean cool adsorbent in adsorption zone 15 and the more readily adsorbable constituents including constituents of intermediate adsorbability if present, are adsorbed to form a rich adsorbent. The less readily adsorbable constituents pass upwardly through lean gas recycle engaging zone 14 and cooling zone 13 as a substantially unadsorbed gas. A portion of this gas passes upwardly into purge gas disengaging zone 12a from which it may be removed via line 65a controlled by valve 66a and the remaining portion is removed from lean gas recycle disengaging zone 13a via line 66 controlled by valve 67 and is recycled by means of lean gas recycle blower 71 through line 72 controlled by valve 73 into recycle gas heat interchanger 74. Herein the hot lean gas removed from lean gas recycle disengaging zone 13a is brought into indirect heat exchange relation to the cool recycle rich gas forming a cool lean gas recycle and a hot rich gas recycle. The cool lean gas recycle subsequently is passed via line 75 controlled by valve 76 into lean gas recycle cooler 77 wherein further cooling is effected. The cool lean gas is then passed via lines 78 and 79 into lean gas recycle engaging zone 14. A portion of the recirculating lean gas is continuously removed from the recycle stream as a lean gas product. If desired it may be removed hot via lines 49 and 51 controlled by valve 52, or it may be removed from line 72 via line 80 controlled by valve 81 and sent via line 82 to further processing facilities or storage not shown. A cool lean gas product may be withdrawn from lean gas recycle cooler 77 via lines 78 and 83 controlled by valve 84 and sent to further processing or storage facilities via line 82.

When there are no constituents in the feed gas mixture of intermediate adsorbability and no side cut gas product is desired, first and second rectification zones 17 and 19 are in actuality a single rectification zone and side cut disengaging zone 18 may be omitted. However, when constituents of intermediate adsorbability are present they may be produced, if desired, as a product stream from side cut gas disengaging zone 18 as described below.

The rich adsorbent present in adsorption zone 15 passes into first rectification zone 17 and is contacted with a side cut gas reflux containing constituents of intermediate adsorbability whereby traces of less readily adsorable constituents are preferentially desorbed and caused to return to the adsorption zone. The partially rectified adsorbent subsequently passes into second rectification zone 19 wherein it is contacted with a rich gas reflux causing a preferential desorption of the constituents of intermediate adsorbability. A portion thereof is employed as the side cut gas reflux while the remaining portion is removed from side cut gas disengaging zone via line 68 at a rate controlled by valve 69 and sent to further processing or storage facilities not shown via line 70. The rectified adsorbent thus formed passes into heating and desorption zone 21 wherein the rectified adsorbent is heated by the hot recirculating rich gas stream and the more readily adsorbable constituents are desorbed. The desorbed constituents are partly employed as rich gas reflux in rectification zone 19, and the remainder is removed from rich gas disengaging zone 20 via line 85 approximately at the temperature of the adsorbent present in the upper part of heating zone 21 and is recirculated as below described to transfer heat in the adsorbent in cooling zone 13 to the adsorbent in heating zone 21.

The rich gas flowing through line 85 is conveyed by means of rich gas recycle blower 86 through line 87 controlled by valve 88 into recycle gas interchanger 74. It is here exchanged with a hot lean gas recycle forming a cool lean gas and a hot rich gas. The heated rich gas subsequently flows via line 89 into rich gas recycle heater 90 wherein it is heated to a temperature somewhat higher than the maximum adsorbent temperature desired in heating zone 21. The heated rich gas recycle subsequently passes via line 91 controlled by valve 92 into rich gas recycle engaging zone 22. The rich gas recycle thus employed removes heat from the recirculating lean gas stream and introduces it into the adsorbent in heating zone 21.

A portion of the recirculating rich gas stream is continuously removed therefrom as a rich gas product. A hot rich gas product may be removed from line 91 through line 93 controlled by valve 94 and sent to further processing or storage facilities, not shown, via line 95. A cool rich gas product may be withdrawn from line 87 via line 96 controlled by valve 97 and sent to production via line 95.

The degree to which the more readily adsorbable constituents normally produced as a rich gas product are removed from the adsorbent in heating zone 21 is dependent both upon the degree of adsorbability of the particular constituent as well as the maximum temperature to which the adsorbent is heated in heating zone 21 and the pressure at which the entire operation is carried out. A rather rough separation may be very easily accomplished with a selective adsorption column of this particular type operating at atmospheric or moderate superatmospheric pressures and at heating zone temperatures in the range of 300 to 400° F. The lower the operating pressure and the higher the heating zone temperature, the greater will be the degree of separation. High degrees of separation may be obtained by recirculating excess quantities of lift gas, formed by allowing part of the lean gas product to pass upwardly through the cooler to desorb residual amounts of rich gas constituents from the cooling adsorbent for combination with the feed gas for reprocessing. The vent or seal gas removed from control valve chamber 57 by means of line 58 may also be recycled to the feed gas to increase the degree of separation.

As an example of the process of this invention the following data are given:

Example

A selective adsorption column two feet in diameter, constructed according to the accompanying drawing and having a direct heater and a direct cooler, is fed 9800 pounds per hour of activated charcoal. The pressure of operation is 150 pounds per square inch, and feed having the following composition

| Component | Mol Percent | Mols Per Day |
|---|---|---|
| $CH_4$ | 21 | 178.5 |
| $C_2H_6$ | 48 | 408.0 |
| $C_3H_8$ | 31 | 263.5 |
| | 100 | 850.0 | is introduced at a rate of 850 pound mols per day. A lean gas recycle rate of 171 mols per hour and a rich gas recirculation rate of 141 mols per hour are employed to cool the adsorbent from 500° F. to 100° F. and heat the adsorbent from 140° F. to 500° F., respectively. A lean gas product and a rich gas product are produced from the process at rates of 545 and 305 pound mols per day, respectively. The product stream compositions are as follows:

| Component | Mol Percent Lean Gas | Mol Percent Rich Gas |
| --- | --- | --- |
| $CH_4$ | 36.6 | |
| $C_2H_6$ | 61.5 | 1.7 |
| $C_3H_8$ | 1.9 | 98.3 |
| | 100.0 | 100.0 |

The rich gas comprises substantially pure propane while the lean gas contains 2% propane contamination which arises from residual propane on the adsorbent passing through the cooler. The results disclosed above were obtained by recirculating the vent or seal gas and the purge gas to the feed gas.

In the description above, the lift gas comprises a mixture of lean gas product and purge gas. It is possible in this process to employ part of the rich gas product for lifting the adsorbent with certain advantages. In lifting with a rich gas, less gas per unit weight of adsorbent is required for lifting since its density and viscosity are greater than the lean gas. The removal of seal gas stream from adsorbent control valve 57 may be eliminated and a portion of the rich gas product is passed via line 89a controlled by valve 88a and via line 33 into induction zone 31. By adjusting valves 88a and 88, a zero pressure differential may be maintained between the induction and heating zones thereby preventing any substantial gas flow therebetween. In this modification a purge gas comprising a mixture of lean gas and rich lift gas is removed from purge gas disengaging zone 12a via line 65a controlled by valve 66a and may be recycled to the feed gas inlet for reprocessing to improve the recovery efficiency. The rich lift gas is recirculated by means of lift gas blower 32 as before. An accurate control of pressure differential between heating zone 21 and induction zone 31 eliminates the necessity of employing sealing leg 26 at the bottom of the column and an adsorbent level in induction zone 31 may be maintained by level control 27 and control valve 28. Preferably, however, a level of adsorbent in induction zone 31 is maintained at a constant position by level controller 31a which may actuate control valves 34, 88a, or valve 92a in line 92a which varies the rate at which the adsorbent is removed from induction zone 31 via lift line 37.

By employing a rich gas for lifting the adsorbent from the bottom to the top of the column and a recycle of purge gas from zone 12a to the adsorption zone 15 through lines 60 and 64, the propane contamination in the lean gas product was reduced to 0.3% under the same operating conditions given in the above example.

In another modification, the lift gas may comprise a part of the feed gas in which the lift gas is introduced into the lift gas cycle via line 47 controlled by valve 48 in which case the lift gas is operated under a lower pressure than the one at which the feed gas is introduced.

Utilities requirements in the present selective adsorption process have been substantially decreased through the elimination of the requirement of stripping steam and a cooling fluid such as water. The heat that is normally removed from the hot adsorbent in the cooling zone and dissipated is now recovered and employed in part to raise the temperature of the adsorbent in the desorption zone. The economy of the operation is therefore proportionally increased.

The process of this invention may be applied to a wide variety of gaseous mixtures containing constituents having different degrees of adsorbability. The process may be carried out employing any of the known granular adsorbents such as aluminum oxide, silica gel, activated charcoal and various other types. The preferred adsorbent is activated coconut charcoal which has been found to be particularly well adapted to the separation of most gaseous mixtures and has been applied with extreme success to the separation of $C_3$ and $C_2$ hydrocarbon constituents from hydrocarbon gas mixtures.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the separation of a gaseous mixture which comprises passing a moving compact unfluidized bed of hot lean adsorbent through a cooling zone in direct countercurrent contact with a controlled flow of recirculating cool lean gas stream to form a hot lean gas and a cool lean adsorbent, said hot lean adsorbent being cooled entirely by means of said recirculated lean gas stream, subsequently contacting said cool lean adsorbent with said gaseous mixture forming a rich adsorbent containing the more readily adsorbable constituents and a lean gas product comprising the less readily adsorbable constituents, directly contacting said rich adsorbent as a compact unfluidized bed in a desorption zone with a controlled countercurrent flow of recirculating hot rich gas to heat said rich adsorbent and desorb at least part of the more readily adsorbable constituents forming a hot lean adsorbent and a relatively cool rich gas, said rich adsorbent being heated entirely by means of said recirculated hot rich gas stream, passing said relatively cool rich gas from said desorption zone and into heat exchange relationship with said hot lean gas removed from said cooling zone to form said hot rich gas and said cool lean gas, recirculating said cool lean gas to said cooling zone and said hot rich gas to said heating zone, separately removing a portion of the recycle streams as gas products, said hot lean gas being at a temperature substantially the same as said hot lean adsorbent entering said cooling zone, said cool rich gas being at substantially the same temperature as said rich adsorbent entering said desorption zone, said hot lean gas being at a temperature substantially greater than said cool rich gas and wherein a substantial temperature gradient is established and maintained in each of said cooling and heating zones by the steps of controlling the countercurrent flow of said lean gas and rich gas respectively therethrough.

2. A process according to claim 1 wherein said recycle lean gas is further cooled to effect a relatively minor temperature change and said recycled rich gas is further heated to effect a relatively minor temperature change after bringing the two into indirect heat exchange relationship in which the major temperature change occurs in said lean gas and said rich gas streams.

3. A process for the separation of a gaseous mixture which comprises passing a moving bed of unfluidized solid granular adsorbent through a cooling zone, subsequently passing the cooled adsorbent through an adsorption zone to contact said gaseous mixture and adsorb the more readily adsorbable constituents thereof to form a rich adsorbent, removing a cool substantially unadsorbed lean gas product comprising less readily adsorbable constituents from the said adsorption zone, heating said rich adsorbent in a heating zone to desorb the adsorbed constituents as a rich gas, cooling said hot lean adsorbent entirely by recirculating a portion of said lean gas countercurrently through said cooling zone while controlling the lean gas flow rate to form a cooled lean adsorbent and a hot lean gas, heating said rich adsorbent entirely by recirculating a portion of said rich gas countercurrently through said heating zone while controlling the rich gas flow rate to form a hot lean adsorbent and a cool rich gas, exchanging heat from said hot lean gas to said cool rich gas prior to recycling said lean gas and said rich gas into said cooling and heating zones respectively, thereby transferring the major proportion of the heat required from said hot lean adsorbent prior to adsorption to the cool rich adsorbent existing after adsorption, maintaining the rate of lean gas recirculation approximately at the value given by $$W_{lg} = W_a \frac{C_{pa}}{C_{plg}}$$

to form said hot lean gas and said cool lean adsorbent and to maintain a substantial temperature gradient in said cooling zone, maintaining the rate of rich gas recirculation approximately at the value given by $$W_{rg} = W_a \frac{C_{pa}}{C_{prg}}$$

to form said cool rich gas and said hot lean adsorbent and to maintain a substantial temperature gradient in said heating zone, wherein the equations $W_a$ is the pounds per hour of recirculated adsorbent, $W_{lg}$ is the pounds per hour of recirculated lean gas, $W_{rg}$ is the pounds per hour of recirculated rich gas, $C_{pa}$ is the specific heat of the recirculated adsorbent and $C_{plg}$ and $C_{prg}$ are the specific heats of the recirculated lean gas and rich gas, respectively, said lot lean gas being removed from said cooling zone at a temperature substantially the same as said hot lean adsorbent introduced thereinto and at a temperature substantially greater than the temperature of said cool rich gas which is removed from said heating zone at substantially the same temperature as said rich adsorbent flowing thereinto.

4. A process according to claim 3 wherein said cool lean gas passes in direct countercurrent heat exchange relationship with said hot lean adsorbent passing through said cooling zone and said hot rich gas passes in direct countercurrent heat exchange relationship with said rich adsorbent passing through said heating zone.

5. A process for the separation of a gaseous mixture which comprises passing a substantially compact moving bed of solid granular adsorbent downwardly by gravity successively through a cooling zone, an adsorption zone, at least one rectification zone and a heating zone, introducing said gaseous mixture into said adsorption zone to adsorb the more readily adsorbable constituents thereof on said adsorbent to form a rich adsorbent and leaving the less readily adsorbable constituents unadsorbed as a cool lean gas, passing at least part of said cool lean gas from said adsorption zone directly and without other treatment into direct countercurrent contact with adsorbent in said cooling zone, controlling the flow rate of said lean gas flow therethrough to form a hot lean gas and a cool lean adsorbent and to establish and maintain a substantial temperature gradient therein, subsequently cooling at least part of said hot lean gas, recycling the cool lean gas thus formed again through said cooling zone, contacting said rich adsorbent with a rich gas reflux in said rectification zone to preferentially desorb traces of said less readily adsorbable constituents forming a rectified adsorbent, heating said rectified adsorbent by a direct countercurrent contact with a recirculating stream of hot rich gas to desorb adsorbed constituents from said rectified adsorbent, controlling the flow rate of said hot rich gas to form a hot lean adsorbent and a cool rich gas, cooling the recirculated stream of hot lean gas by indirect heat exchange with said recirculated stream of cool rich gas forming a cool lean gas and a hot rich gas for reintroduction into said cooling and heating zones respectively, removing said hot lean adsorbent from said heating zone, suspending said adsorbent in a lift gas and conveying it to a separation zone wherein said lift gas is separated from said adsorbent, recirculating lift gas from said separation zone to form further quantities of said suspension, transferring separated adsorbent from said separation zone to said cooling zone, continuously removing a portion of said recirculating rich gas as a rich gas product, and continuously removing a portion of said recirculated lean gas as a lean gas product.

6. A process for the separation of a gaseous mixture which comprises passing a substantially compact bed of granular adsorbent downwardly by gravity successively through a direct cooling zone, an adsorption zone, a first rectification zone, a second rectification zone and a direct heating zone, removing hot lean adsorbent from said heating zone, conveying the thus removed adsorbent to said cooling zone for recirculation through the aforementioned zones, introducing said gaseous mixture into said adsorption zone forming a rich adsorbent and an unadsorbed lean gas, removing a portion of said lean gas from said adsorption zone as a lean gas product, passing the remaining portion of said lean gas directly from said adsorption zone and without further treatment upwardly in direct countercurrent contact with the bed of lean adsorbent moving through said cooling zone, controlling the flow rate of lean gas therethrough to form a cool lean adsorbent and a hot lean gas having a temperature substantially equal to that of lean adsorbent entering said cooling zone, removing said hot lean gas from said cooling zone, cooling at least part thereof by heat exchange with a cool rich gas to form cool lean gas and a hot rich gas, recirculating the cooled lean gas directly through said cooling zone, passing rich adsorbent containing more readily adsorbable constituents and constituents of intermediate adsorbability into said first rectification zone, contacting the rich adsorbent with a side cut gas reflux containing constituents of intermediate adsorbability thereby desorbing less readily adsorbable constituents forming a partially rectified adsorbent, contacting this adsorbent in said second rectification zone with a rich gas reflux comprising more readily adsorbable constituents thereby desorbing constituents of intermediate adsorbability as a side cut gas, employing part of said side cut gas as said side cut gas reflux and removing the remainder as a side cut gas product, directly heating said rectified adsorbent in said heating zone by injecting thereinto a countercurrent flow of said hot rich gas containing more readily adsorbable constituents, said flow being controlled to maintain a substantial temperature gradient therein thereby forming a hot lean adsorbent and desorbing further quantities of said constituents as a cool rich gas, removing part of said rich gas from said heating zone as a rich gas product, passing said recirculated hot lean gas in indirect heat exchange relation with said recirculated stream of cool rich gas forming said hot rich gas and said cool lean gas thereby transferring a major proportion of the heat removed from the adsorbent in said cooling zone to the adsorbent in said heating zone, said hot lean gas being at a substantially higher temperature than said cool rich gas.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,548,280 | Ray | Aug. 4, 1925 |
| 1,808,494 | Carney et al. | June 2, 1931 |
| 1,825,707 | Wagner, Jr. | Oct. 6, 1931 |
| 1,836,301 | Bechthold | Dec. 15, 1931 |
| 1,900,655 | Metzger | Mar. 7, 1933 |
| 2,354,383 | Kiesskalt | July 25, 1944 |
| 2,384,311 | Kearby | Sept. 4, 1945 |
| 2,519,873 | Berg | Aug. 22, 1950 |
| 2,527,964 | Robinson | Oct. 31, 1950 |

FOREIGN PATENTS

| Number | Country | Date |
|---|---|---|
| 317,629 | Great Britain | Aug. 22, 1929 |